Patented Nov. 27, 1934

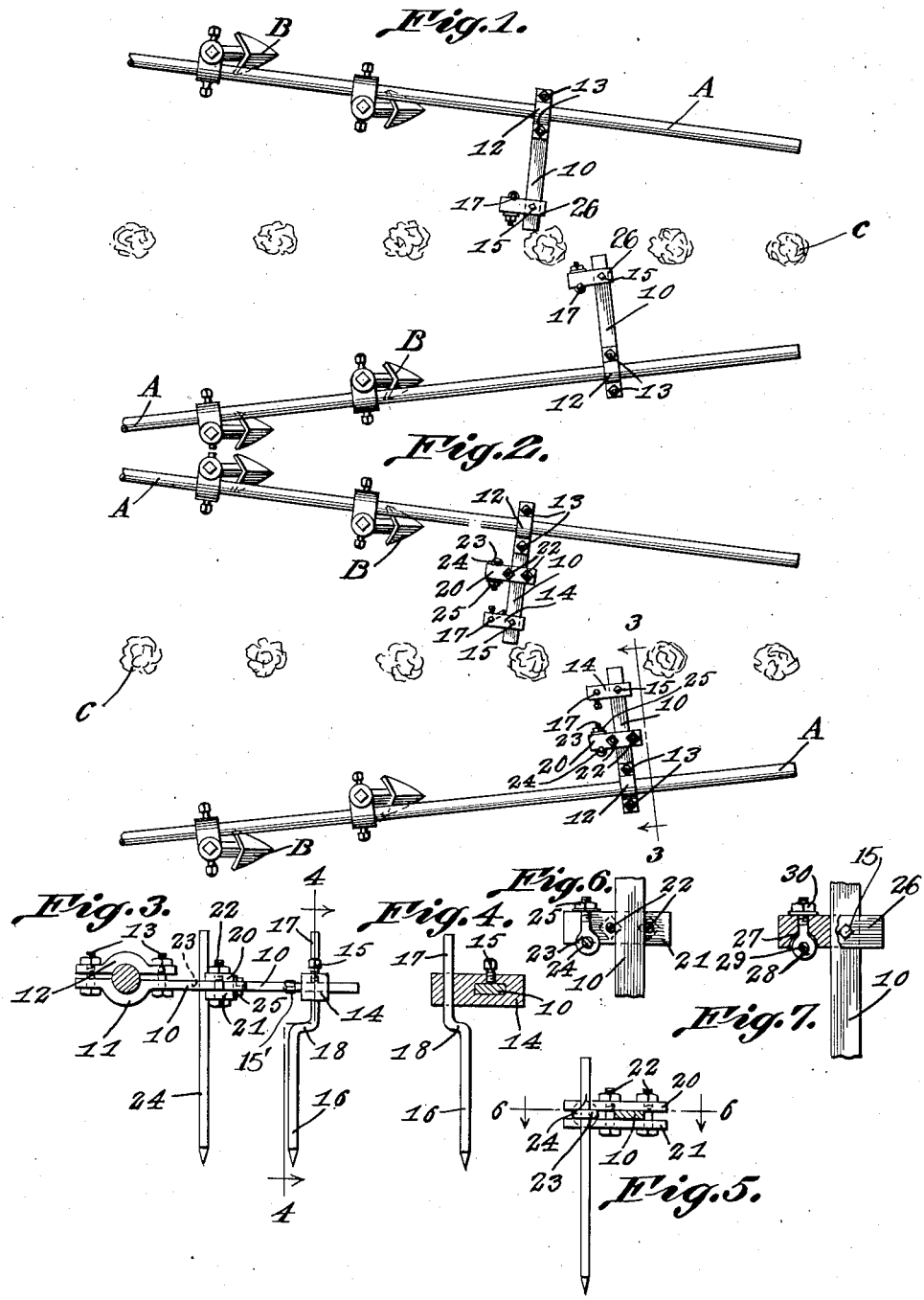

1,982,417

UNITED STATES PATENT OFFICE 1,982,417

CULTIVATOR ATTACHMENT

David Nathaniel Bruton, Mertens, Tex.

Application January 3, 1934, Serial No. 705,126

5 Claims. (Cl. 97—179)

The invention relates to a cultivator attachment and more especially to attachments for cotton cultivators or the like.

The primary object of the invention is the provision of an attachment of this character wherein the same is adapted to be mounted upon the cultivator beams, either of the single row or double row type, whereby in the cultivation of cotton the ground at the young plant can be worked so as to destroy young or tender grass and weeds without disturbing or destroying the young cotton.

Another object of the invention is the provision of an attachment of this character wherein in the use thereof with the cultivator the tops of cotton rows can be made flat and at the same time removing or destroying grass and plants therebetween and without disturbing or destroying the cotton during the cultivation of the same.

A further object of the invention is the provision of an attachment of this character which is extremely simple in construction, thoroughly reliable and effective for its purpose, readily and easily mounted upon and removed from the beams of cultivators, strong, durable, conveniently adjustable, and inexpensive to manufacture and install.

With these and other objects in view, the invention consists in the features of construction, combination and arrangement of parts as will be hereinafter more fully described in detail, illustrated in the accompanying drawing, which discloses the preferred embodiment of the invention, and pointed out in the claims hereunto appended.

In the accompanying drawing:

Figure 1 is a fragmentary top plan view of a cultivator beam showing the cultivator plows and the attachment constructed in accordance with the invention applied.

Figure 2 is a view similar to Figure 1 showing the attachment in doubles.

Figure 3 is an enlarged sectional view on the line 3—3 of Figure 2, looking in the direction of the arrows.

Figure 4 is a sectional view on the line 4—4 of Figure 3, looking in the direction of the arrows.

Figure 5 is an elevation of a modified form of attachment.

Figure 6 is a sectional view on the line 6—6 of Figure 5.

Figure 7 is a view similar to Figure 6 showing a further modification.

Similar reference characters indicate corresponding parts throughout the several views in the drawing.

Referring to the drawing in detail, A designates generally a portion of a cultivator beam carrying the cultivating plows or blades B, these being of standard kind, and to this beam is attached the device or attachment constituting the present invention, in front of the plows.

The device or attachment comprises a flat arm 10 preferably made from strap iron having formed at one end a half-bearing 11 for cooperation with the separable half-bearing 12, the latter being secured as a companion to the bearing 11 by the fasteners 13, so that the arm 10 can be clamped to the beam A of the cultivator to project laterally therefrom. In Figure 1 of the drawing, each arm 10 has fitted thereon a block-like hanger 14 slidable upon said arm and held in adjusted position by a set screw 15. In this hanger is fitted a pin tooth 16, the upper end 17 of which is offset by the bight 18 and the lower end of the tooth is pointed for ground working purposes. It is preferable to have these arms 10 on the beams A of the cultivator in front of the plows B and directed toward each other, one slightly in advance of the other, with the teeth 16 carried by the hanger 14 located for working action close to young cotton plants C, so that grass and weeds may be destroyed in the use of the attachment and without destroying or in any way damaging the plants during cultivation.

In Figure 2 of the drawing the arms 10, in addition to the hangers 14, have fitted thereon clips including top and bottom plates 20 and 21, respectively, these being joined by fasteners 22 which are at opposite sides of the arm 10, with the plates 20 and 21 straddling the latter at the upper and lower faces of said arm. Arranged between the plates 20 and 21 is a horizontally disposed eye bolt 23 in which is fitted a pin tooth 24, the bolt being engaged by a binding nut 25 so that the tooth 24 can be drawn into edge abutment with respect to the plates 20 and 21 for the fastening of said tooth and the holding of the same in working relation to the ground. In this fashion, each beam A will be equipped with teeth in double or single.

It will be noted that I have illustrated the various forms of my structure in use, in Figures 1 and 2, and while the teeth may be adjustably secured in the hangers 14 through the instrumentality of set screws 15', as shown in Figure 3, I also employ eye bolts for that purpose as clearly shown in Figure 7. In this figure an arm 10 is illustrated, with a block like hanger 26 similar to the hanger 14, in that both the hangers 14 and 26 are provided with squared bores adjacent to one of the ends thereof to slidably fit the arm with the latter passing therethrough so that the hangers are mounted for adjustment longitudinally of the arm, with the set screws 15 for holding the hangers adjusted on the arm.

The hanger 26 is provided with a bore adjacent to its opposite end with a socket 27 communicating with the bore as clearly shown in Figure 7, and the bore and socket receive an eye bolt 28, with a tooth 29 disposed in the eye portion thereof. The tooth is adjustable vertically in the eye portion of the eye bolt, and threaded to the eye bolt is a binding nut 30 for drawing the eye portion into the socket and the tooth against the hanger to secure the latter in adjusted position.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What is claimed is:

1. The combination with a pair of cultivator beams, an attachment for each beam comprising a flat arm, means for detachably and adjustably securing the arms to the beams one in advance of the other to project laterally from the beams and in a direction toward each other, hanger means mounted for adjustment longitudinally on the arms, a pin tooth for each hanger means, and means for securing the teeth for vertical adjustment with respect to the hanger means 2. An attachment for a cultivator comprising a straight flat arm, a half bearing formed on one end of said arm, a separable half bearing cooperating with the first mentioned half to secure the arm to a beam of the cultivator to project laterally therefrom, hanger means including means to slidably fit the arm and mounted for adjustment longitudinally thereon, bolt means for securing the hanger means adjusted on the arm, a pin tooth mounted for vertical adjustment and carried by the hanger means, and means for securing the tooth in adjusted position.

3. An attachment for a cultivator comprising a flat arm, means for detachably and adjustably securing the arm to a beam of the cultivator to project laterally therefrom, hanger means mounted for adjustment longitudinally on said arm, an eye bolt extending through the hanger means, a pin tooth mounted for vertical adjustment in the eye portion of the bolt, and means threaded on the eye bolt for drawing the tooth against the hanger to secure the tooth in adjusted position.

4. An attachment for a cultivator comprising a flat arm, means for detachably and adjustably securing the arm to a beam of the cultivator to project laterally therefrom, a clip including upper and lower plates, means for securing the plates on said arm for adjustment longitudinally thereon, an eye bolt having its shank between the plates, a pin tooth mounted for vertical adjustment in the eye portion of the bolt, and means threaded on the eye bolt for drawing the tooth against the plates to secure the tooth in adjusted position.

5. An attachment for a cultivator comprising a flat arm, means for detachably and adjustably securing the arm to a beam of the cultivator to project laterally therefrom, a block like hanger having a squared bore therein adjacent one end to slidably fit the arm with the latter passing therethrough so that the hanger is mounted for adjustment longitudinally of the arm, a set screw for the hanger for holding the latter adjusted on the arm, said hanger having a bore adjacent its opposite end with a socket at one end thereof, an eye bolt in the last mentioned bore, a tooth adjustable vertically in the eye portion of the eye bolt, and means threaded on the eye bolt for drawing the eye portion into the socket and the tooth against the hanger to secure the tooth in adjusted position.

DAVID NATHANIEL BRUTON.